United States Patent
Ziegler

(10) Patent No.: US 11,530,020 B2
(45) Date of Patent: Dec. 20, 2022

(54) RECUPERATIVE JET DRIVE

(71) Applicant: Martin Ziegler, Steinen (CH)

(72) Inventor: Martin Ziegler, Steinen (CH)

( * ) Notice: Subject to any disclaimer, the term of this patent is extended or adjusted under 35 U.S.C. 154(b) by 492 days.

(21) Appl. No.: 16/618,071

(22) PCT Filed: May 28, 2018

(86) PCT No.: PCT/EP2018/063914
§ 371 (c)(1),
(2) Date: Nov. 27, 2019

(87) PCT Pub. No.: WO2018/219856
PCT Pub. Date: Dec. 6, 2018

(65) Prior Publication Data
US 2020/0156750 A1 May 21, 2020

(30) Foreign Application Priority Data
May 29, 2017 (CH) ..................................... 00692/17

(51) Int. Cl.
*B63H 11/103* (2006.01)
*B64C 11/00* (2006.01)
(Continued)

(52) U.S. Cl.
CPC ............. *B63H 11/103* (2013.01); *B63H 1/16* (2013.01); *B63H 1/28* (2013.01); *B63H 5/10* (2013.01);
(Continued)

(58) Field of Classification Search
CPC .......... B63H 11/103; B63H 1/16; B63H 1/28; B63H 5/10; B63H 2011/085;
(Continued)

(56) References Cited

U.S. PATENT DOCUMENTS

| 4,931,026 A | 6/1990 | Woodland |
| 5,642,984 A * | 7/1997 | Gorlov ...................... F03D 3/02 |
| | | 416/DIG. 6 |
| 2009/0194997 A1 | 8/2009 | Stabins |

FOREIGN PATENT DOCUMENTS

| DE | 102004008805 A1 | 9/2005 |
| EP | 2730501 A2 | 5/2014 |

(Continued)

OTHER PUBLICATIONS

International Search Report and Written Opinion for related International Application No. PCT/EP2018/063914, dated Aug. 24, 2018; English translation of ISR provided (17 pages).

(Continued)

*Primary Examiner* — Anthony D Wiest
(74) *Attorney, Agent, or Firm* — Procopio, Cory, Hargreaves & Savitch LLP

(57) ABSTRACT

A method and device is provided for increasing the efficiency of jet drives by recuperating effective power from the propulsion flow. A ducted propeller in the propeller housing, driven by a driving engine via a drive shaft, conveys the fluid for the jet drive out of the interior $V_i$ of a radial turbine. The fluid is accelerated axially and ejected backwards against the direction of travel. This creates thrust. Because the pressure in the interior of the turbine decreases, new fluid from the environment flows directly via the blades of the rotating radial turbine from the outside to the inside, thereby driving them. A guide apparatus is missing. The power of the radial turbine is transmitted via a transmission to the drive shaft of the propeller, which relieves the driving engine and increases the efficiency of the jet drive. The invention is particularly suitable for electric drives.

14 Claims, 5 Drawing Sheets

(51) Int. Cl.
*F02C 7/36* (2006.01)
*B63H 1/16* (2006.01)
*B63H 5/10* (2006.01)
*B63H 1/28* (2006.01)
*B63H 11/08* (2006.01)

(52) U.S. Cl.
CPC .............. *B64C 11/001* (2013.01); *F02C 7/36* (2013.01); *B63H 2011/085* (2013.01)

(58) Field of Classification Search
CPC .......... B64C 11/001; B64C 11/00; F02C 7/36; F02C 7/04; Y02E 10/74; F04D 19/00; F04D 25/028; F42B 19/24; F05D 2250/51; F02K 5/00; F02K 3/00; F01D 1/22; F03D 3/061; A63H 29/10
USPC .............................................. 60/330; 440/47
See application file for complete search history.

(56) References Cited

FOREIGN PATENT DOCUMENTS

GB         2530324  A      3/2016
WO    WO-0148374  A2 *   7/2001   ............ F03B 13/142

OTHER PUBLICATIONS

International Preliminary Report on Patentability for related PCT App No. PCT/EP2018/063914 dated Dec. 12, 2019, 20 pgs.

\* cited by examiner

Figure 1:
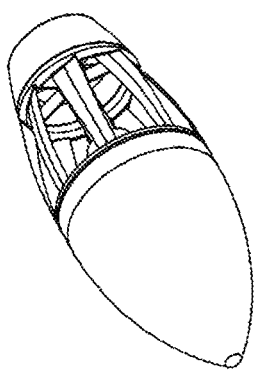
Figure 1:
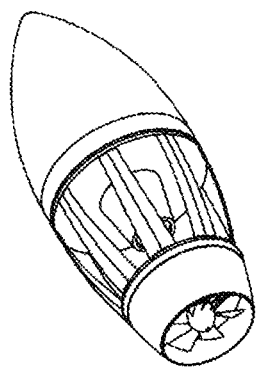
Figure 1:
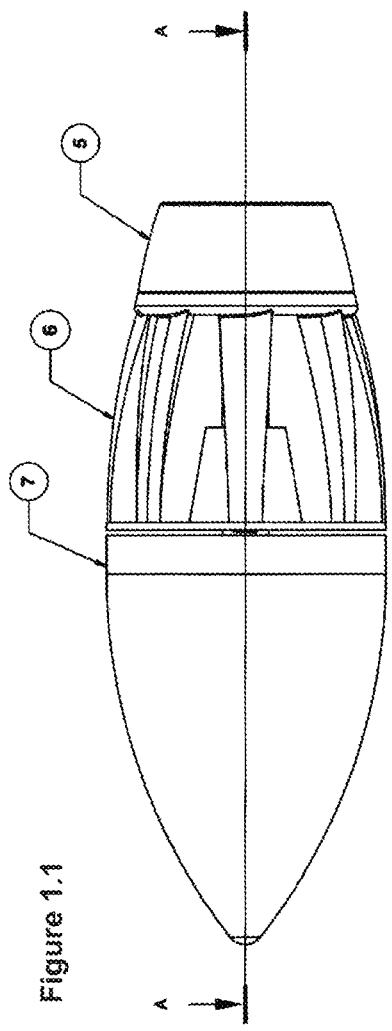
Figure 1:
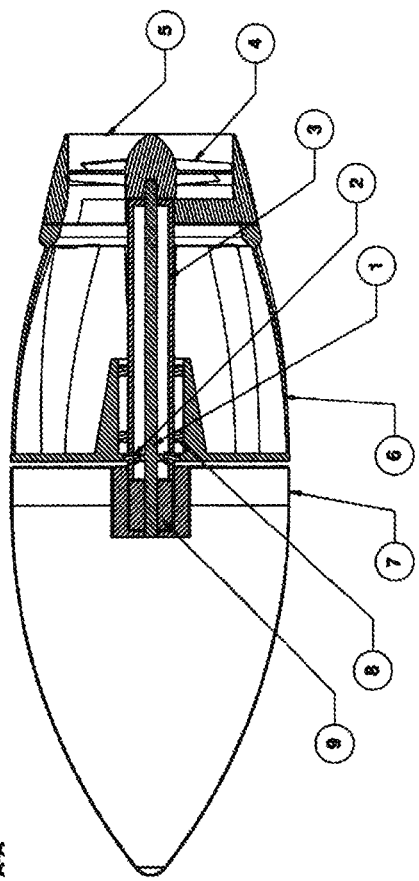

Figure 1.2
Schnitt A-A

RECUPERATIVE JET DRIVE

CROSS-REFERENCE TO RELATED APPLICATIONS

This application is a U.S. National Stage entry of PCT Application No: PCT/EP2018/063914 filed May 28, 2018, which claims priority to Swiss Patent Application No. 00692/17, filed May 29, 2017, the contents of which are incorporated herein by reference.

The invention relates to a method and a device for increasing the efficiency of jet drives by recuperating effective power from the propulsion flow. It is described as a propulsion system for aircraft but can generally be used for the propulsion of all types of vehicles. These include aircraft, land vehicles, and ships.

State-of-the-art jet drives convey air or water with the aid of a propulsor and generate a jet of high velocity which is ejected backwards against the direction of travel. The propulsor is driven by a driving engine, which can be a thermal engine or an electric motor. According to the general propulsion theory, a thrust force results from the difference of the flow impulses at the balance limits of a jet drive. This theory is based on Newton's laws of force, and thus thrust arises as a reaction to inertial forces from the acceleration of stationary fluids. It is used to power vehicles.

The efficiency of jet drives is the ratio of thrust power to power applied. The thrust power is the product of the thrust force multiplied by the velocity of the vehicle. It is required to move the vehicle through air or water. The power applied is mechanical shaft power for the propulsor from the driving engine. This includes the losses of kinetic energy in the downstream flow of the jet drive. In addition, there are heat losses from the driving engine.

The energy consumption of jet drives is characterized by the thrust-specific power, which is the drive power P per thrust F. It is measured in watts per newton, which is a velocity. According to Rankine's theory, the thrust-specific power of the simple jet drive results as an arithmetic mean of the velocities of inflow v and outflow c of the propeller. This includes the jet losses in the wake current, but not the heat losses of the driving engine.

$$\frac{P_0}{F_0} = \frac{c+v}{2} \quad \text{thrust-specific power according to Rankine} \quad (G1)$$

In order to increase the efficiency of a jet drive, its thrust-specific power must be reduced. Mathematically, it means reducing the numerator of the fraction or increasing its denominator. The theory according to Rankine is therefore extended by an additional power $\Delta P$ and an additional force $\Delta F$ and you get:

$$\frac{P}{F} = \frac{P_0 + \Delta P}{F_0 + \Delta F} < \frac{P_0}{F_0} \quad \text{extended thrust-specific power} \quad (G2)$$

The quotient $$\frac{P}{F}$$

is always less than the original value according to Rankine $$\frac{P_0}{F_0}$$

if the additional power $\Delta P$ is negative and the additional force $\Delta F$ is positive. Exactly then the drive is more efficient than before. From a thermodynamic point of view, power is negative if it is delivered by a machine and is available as effective power for a drive. A force is positive when it acts in the direction of motion.

An effective power can be obtained by recuperating energy from the propulsion flow. In ships, the Grim vane wheel is known here to recover energy in the wake flow of the ship's propeller with an axial flow engine and to increase the efficiency of the drive. A disadvantage here is the interference between propeller and vane wheel, with a high dynamic load on all blades and a loss of thrust on the main propeller. In aircraft, a recuperation of effective power from the propulsion flow is not known.

It is the object of the invention to find a method and a device with which the efficiency of jet drives can be increased by recuperating effective power from the propulsion flow not only on ships but also on aircrafts. In this case, the dynamic load of the propeller from flow interferences should be lower than before. The object is fulfilled by a method according to claim 1 and a device according to claim 4 and following.

THE INVENTION IS DESCRIBED BY 5 FIGURES

1. Representation of a jet drive with all main components as a possible embodiment example of the invention,
2. Representation of the principle of action for the recuperation of energy from the propulsion flow,
3. Representation of the flow forces at the rotor of the radial turbine,
4. Example of a fuselage integration of the drive.
5. Example with power output to an open rotor.

The propeller of the jet drive generates a propulsion flow. This is used here to drive a radial turbine, the additional power of which is transmitted via a transmission to the drive shaft of the propeller. This relieves the load on the driving engine. The radial turbine is designed in such a way that the flow forces generated at its blades comprise both a tangential force component $F_t$ in the direction of rotation as well as an axial force component $F_x$ in the direction of motion. The tangential component produces a torque at the radial turbine. This results in the additional power $\Delta P$. The additional thrust $\Delta F$ results from the axial force component.

FIG. 1 shows an embodiment example of the new drive. A ducted propeller (4) in the propeller housing (5) is driven by a driving engine (9) via the drive shaft (1) in the shaft tunnel (3). The drive shaft (1) is coupled to the radial turbine (6) via a transmission (2). The radial turbine (6) has no guide apparatus and is mounted on ball bearings (8) on the shaft tunnel (3). It rotates around the longitudinal axis between the fuselage (7) and the propeller housing (5). Its blade contour follows the shape of a low-resistance flow body between fuselage (7) and propeller housing (5), wherein the rotor diameter tapers from front to rear. The propeller (4) conveys air from the interior of the radial turbine (6) and generates a jet to the rear. This creates the thrust for propulsion. As thus the pressure within the interior of the radial turbine decreases, air flows from outside through the turning rotor and affects locally effective flow forces at its blades. This results in additional power and additional thrust, and because of $$\frac{P}{F} < \frac{P_0}{F_a}$$

the efficiency of the drive increases.

Figure 2:
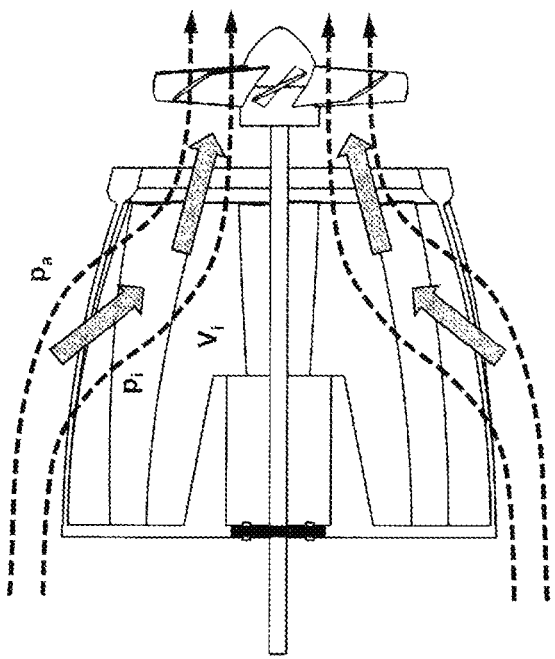
Figure 2:
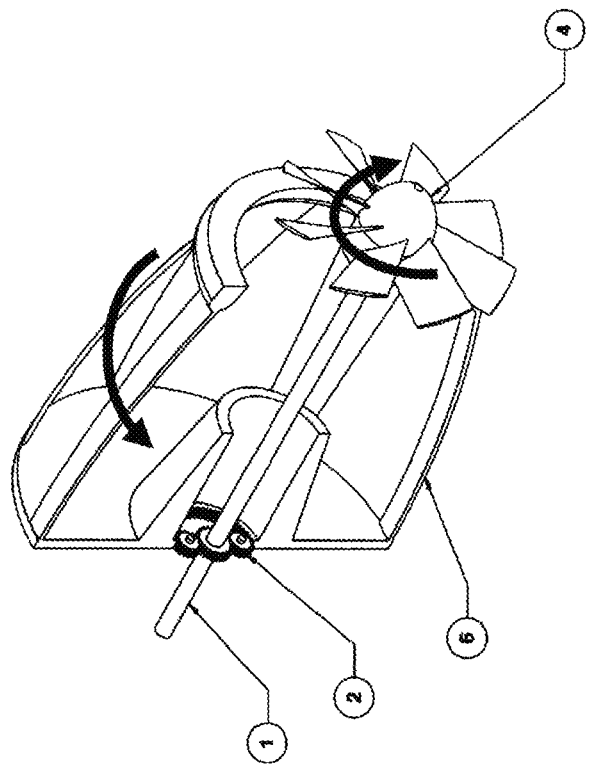

FIG. 2 shows the principle of recuperation from the propulsion flow.

FIG. 2.1 shows the main components. The propeller (4) is driven by the drive shaft (1). It is coupled to the rotor (6) of the radial turbine via the transmission (2). The transmission (2) is symbolized by the gearwheels shown, wherein the transmission can be mechanical (e.g. planetary transmission) or (electro-)magnetic (e.g. magnetic gear, Ward-Leonard set, motor-generator with electronically controlled coupling) or as a flow gear (extended flow coupling with torque converter). The fluid flows to the rotor from the environment without spin. The delivered turbine power relieves the driving engine. Propeller (4) and turbine (6) rotate in opposite directions, which compensates torques from the drive.

FIG. 2.2 shows the resulting flow field. The propeller conveys air out of the volume $V_i$ of the rotor interior. The internal pressure $p_i$ thus decreases there. Because the external pressure $p_a$ is now higher, air inevitably flows from outside and crosses the rotating blades of the radial turbine. This creates usable flow forces.

Figure 3:
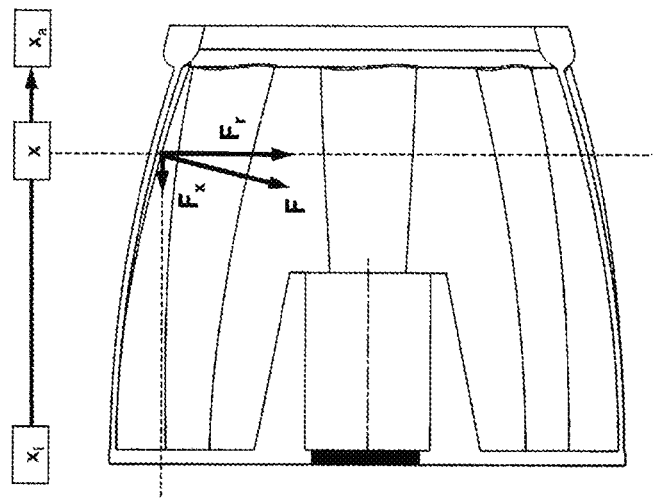
Figure 3:
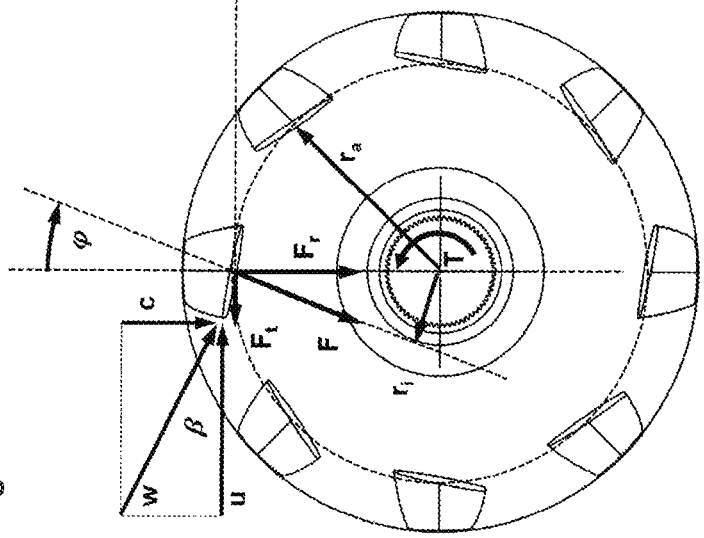

FIG. 3 shows the flow forces at the blades of the turbine rotor.

FIG. 3.1 shows a radial blade section at any point of the rotor (section coordinate $x_s$), which extends from the fuselage (longitudinal coordinate $x_0$) up to the propeller housing (longitudinal coordinate $x_1$). FIG. 3.2 shows a longitudinal section and the position of the radial section from FIG. 3.1.

FIG. 3.1 shows the incoming flow in the radial blade section. The inflow c to turbine occurs in radial direction without spin. A guide apparatus is missing. By superimposition with the blade inflow u the circumferential velocity results in a relative inflow w at the blade which is inclined to the tangent of the cutting circle with radius $r_a$. The blades are profiled and twisted against the tangent of the cutting circle. The twist of the profiles increases from front to rear. The rotor diameter decreases thereby. From the inflow against the blade section with relative velocity w now an eccentrically acting lifting force $F_a$ is generated, the line of action of which is inclined at an angle φ against the radial direction and extends at a distance $r_i$ from the axis of rotation. Thus, the lifting force $F_a$ with distance $r_i$ causes a torque M around the longitudinal axis. This results in a useful additional power ΔP which relieves the driving engine and reduces the numerator in equation (G2).

With the angle of inclination φ one can split the lifting force $F_a$ into a radial component $F_r$ and a tangential component $F_t$. The radial component $F_r$ acts against the centrifugal force from the rotation. It relieves the blades. The tangential component $F_t$ causes the torque for the additional power.

The longitudinal section according to FIG. 3.2 shows the inclination of the lifting force $F_a$ in flight direction. The taper of the rotor from front to rear results in a force component $F_x$ in the local blade flow in the direction of motion. This is an additional force ΔF which enlarges the denominator in equation (G2) and further increases efficiency.

Figure 4:
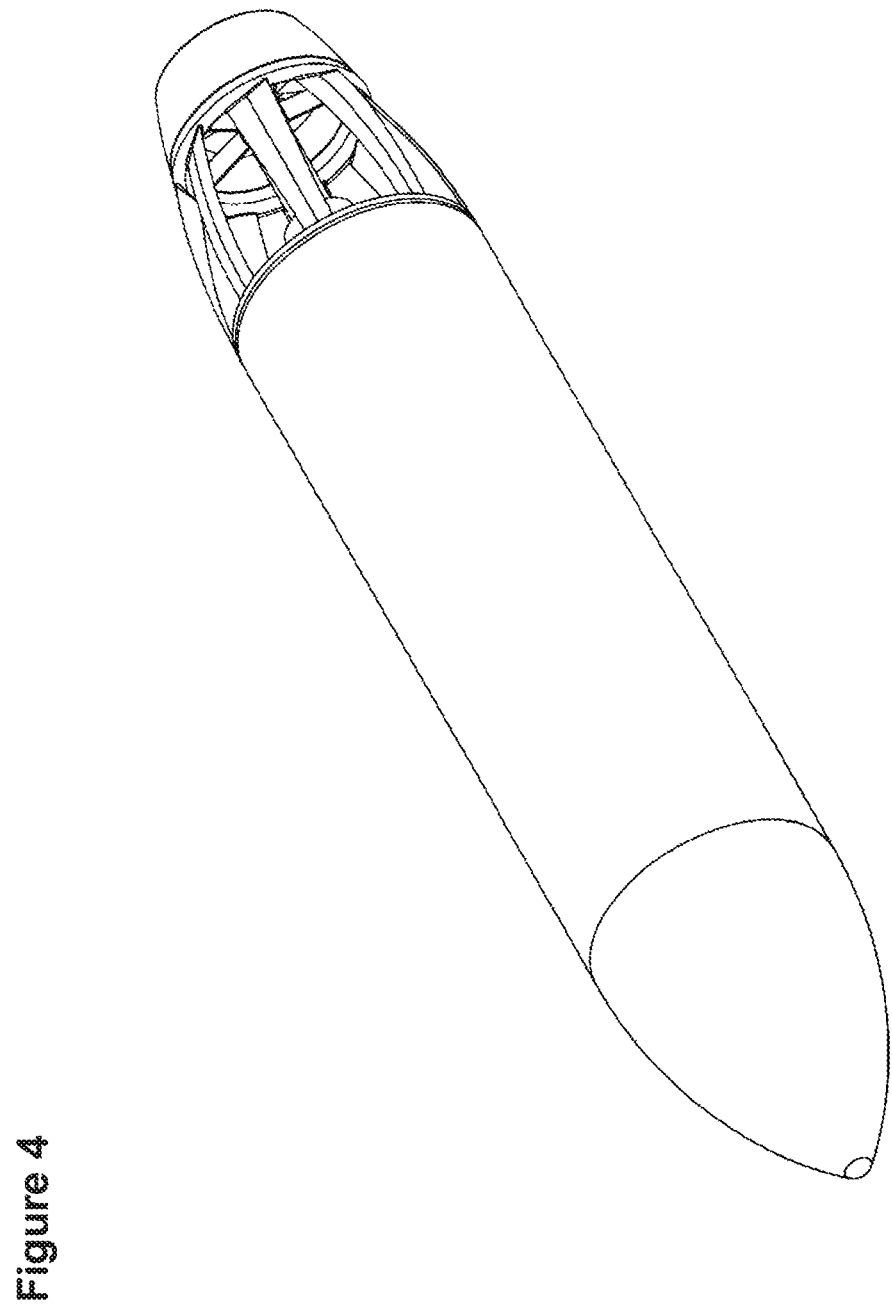

FIG. 4 shows an example of the drive as part of an aircraft fuselage. It is in the slipstream of the fuselage. The propeller always draws its inflow from the inner volume of the radial turbine. An inhomogeneous potential sink remains there during the entire journey. It has a local pressure and a local velocity at each point in space. This results in flow forces which cause an additional thrust and additional power. In this way, power is recovered from the propulsion flow flowing into the propeller, which is recuperation. Compared to the simple Rankine theory, equation (G2) now applies, and the new drive is more efficient than before.

In ships, the recovery of effective power from the wake current flow of the propeller is known as the Grim vane wheel. This is an axial flow machine. Now power is recovered from the inflow with the help of a radial flow machine. In contrast to known radial turbines, a guide apparatus is missing.

The new principle of recuperation of power from the propulsion flow can be carried out with air or water or with another fluid. This allows the required power of the driving engine (9) to be considerably reduced. The invention is particularly suitable for drives with electric motors.

For low velocities it may be advantageous to transfer only a first part of the power of the radial turbine (6) to the propeller shaft (1). A second part can be given directly to an open rotor (10), the propeller blades (11) of which are firmly connected to the radial turbine (6). In this case, the open rotor (10) is directly driven by the radial turbine (6).

Figure 5:
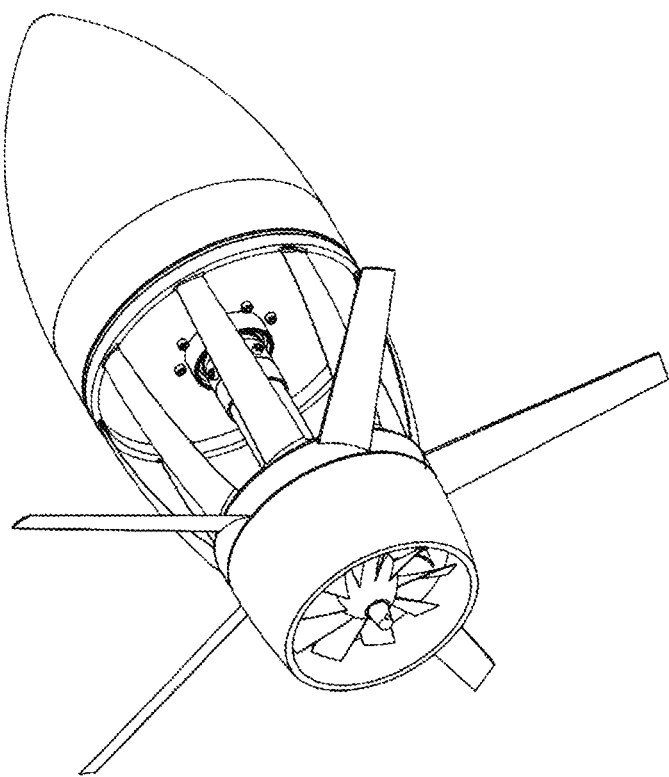
Figure 5:
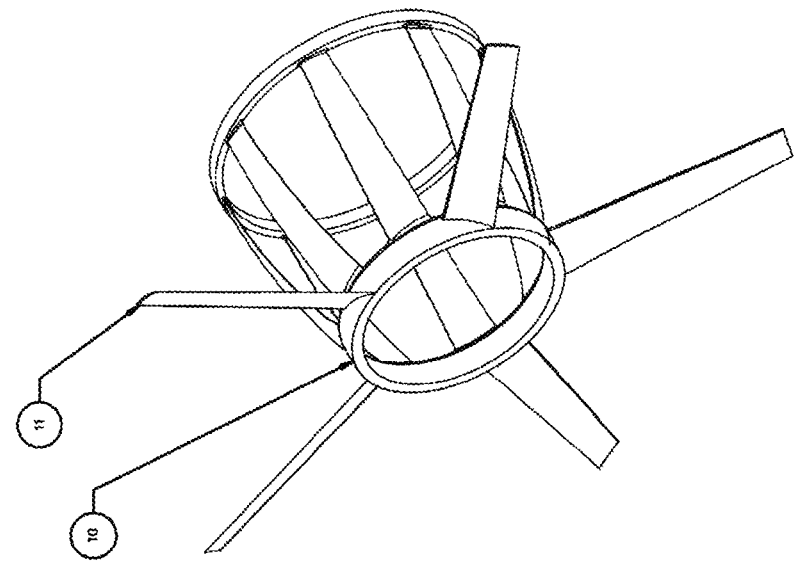

FIG. 5 shows an embodiment example of such a construction. The open rotor (10) has a larger diameter than the radial turbine (6). Its propeller blades (11) are firmly connected to the radial turbine and generate axial thrust. At low velocities, this arrangement is advantageous because the turbine power is given to a rotor with a larger diameter, which reduces jet losses.

LIST OF REFERENCE NUMBERS

1 Drive shaft
2 Transmission (mechanical, magnetic, fluid)
3 Shaft tunnel
4 Propeller
5 Propeller housing
6 Radial turbine
7 Fuselage
8 Ball bearing
9 Driving engine (thermal engine or electric motor)
10 Open rotor
11 Propeller blade

ABBREVIATIONS AND SYMBOLS c Jet velocity (propeller theory of Rankine)
c Absolute flow velocity (velocity triangle)
F Thrust
$F_0$ Thrust according to propeller theory by Rankine
ΔF Additional force
$F_a$ Lifting force
$F_r$ Force component in the radial direction
$F_t$ Force component in the tangential direction
$F_x$ Force component in the axial direction
M Torque
p Pressure
$p_a$ External pressure, outside the radial turbine
$p_i$ Internal pressure, inside the radial turbine
P Drive power
$P_0$ Drive power according to Rankine's propeller theory
ΔP Additional power
r Radius
$r_a$ Outer radius
$r_i$ Inside radius
u Peripheral velocity (velocity triangle)
v Cruising velocity (Rankine's propeller theory)
$V_i$ Volume in the interior of the radial turbine
w Relative flow velocity (velocity triangle)
x Longitudinal coordinate of a rotor section ($x_s=x_0 \ldots x_1$)
φ Radial inclination angle of the blade force

The invention claimed is:

1. A method for increasing an efficiency of jet drives by recuperating effective power from a propulsion flow, characterized in that in a propeller housing a ducted propeller, driven by a driving engine via a drive shaft, conveys a fluid for the jet drive from an interior of a radial turbine, in that the propeller accelerates the fluid axially and ejects the fluid backwards against a direction of travel, in that a new fluid from an environment flows from an outside to an inside directly via blades of the radial turbine without a guide apparatus and thereby drives the radial turbine, and in that a power of the radial turbine is transmitted via a transmission to the drive shaft of the propeller, which relieves the driving engine.

2. The method according to claim 1, characterized in that the fluid is air.

3. The method according to claim 1, characterized in that the fluid is water.

4. The method according to claim 1, characterized in that part of the power from the radial turbine is given directly to an open rotor, the propeller blades of which are firmly connected to the radial turbine, and which accelerates fluid from the environment and produces axial thrust.

5. A device for increasing an efficiency of jet drives by recuperating effective power from a propulsion flow, characterized in that in a propeller housing contains a ducted propeller, which is driven by a driving engine via a drive shaft, and in that the propeller housing contains a radial turbine without a guide apparatus through which fluid from an environment flows, wherein the fluid firstly flows through the radial turbine and then through the propeller, and in that the radial turbine is connected to a transmission by which power of the radial turbine can be transmitted to the drive shaft.

6. The device according to claim 5, characterized in that the driving engine is an electric motor.

7. The device according to claim 5, characterized in that the driving engine is a thermal engine (gas turbine, piston engine).

8. A radial turbine for a device according to claim 5, characterized in that the radial turbine does not have a guide apparatus, in that the radial turbine is positioned between a fuselage and the propeller housing, in that an axis of rotation of the radial turbine points in a direction of travel, in that blades of the radial turbine follow contour of a low-resistance flow body between the fuselage and the propeller housing, in that the blades of the radial turbine are profiled like wings, in that the profiles of the blades are twisted in a longitudinal direction, in that the twist of the profiles increases from front to rear, and in that a ratio of a blade length to an average blade depth is greater than four such that the blades are substantially longer than wide.

9. The radial turbine according to claim 8, characterized in that a diameter of a turbine rotor decreases from front to rear.

10. The radial turbine according to claim 8, characterized in that the axis of rotation of the radial turbine is positioned coaxially to the propeller.

11. The radial turbine according to claim 8, characterized in that a direction of rotation of the radial turbine is opposite to that of the propeller.

12. The radial turbine according to claim 8, characterized in that the radial turbine comprises an open rotor the propeller blades of which are fixedly connected to the radial turbine.

13. The device according to claim 5, characterized in that the transmission comprises a direct power transmission, and
   wherein the direct power transmission comprises a gear transmission or a planetary transmission.

14. The device according to claim 5, characterized in that the transmission comprises an indirect power transmission,
   wherein the indirect power transmission comprises a magnetic, an electro-magnetic, or a fluid power transmission,
   wherein the magnetic power transmission comprises permanent magnets,
   wherein the electro-magnetic power transmission comprises a Ward-Leonard set or an electronically controlled electric motor/generator coupling, and
   wherein the fluid power transmission comprises an extended fluid coupling with torque converter.

* * * * *